US006893697B2

(12) United States Patent
Arthur

(10) Patent No.: US 6,893,697 B2
(45) Date of Patent: May 17, 2005

(54) SAFETY SHIELD FOR CHEMICAL AND BIOLOGICAL PROTECTION

(76) Inventor: Mark C. Arthur, 2230 Bridge Ave., No. 6, Point Pleasant, NJ (US) 08742

( * ) Notice: Subject to any disclaimer, the term of this patent is extended or adjusted under 35 U.S.C. 154(b) by 47 days.

(21) Appl. No.: 10/422,107

(22) Filed: Apr. 25, 2003

(65) Prior Publication Data

US 2004/0213937 A1 Oct. 28, 2004

(51) Int. Cl.[7] .................................................. B32B 3/02

(52) U.S. Cl. ..................... 428/40.1; 206/411; 428/42.1; 428/42.2; 428/43; 428/192; 428/194; 428/213; 428/220

(58) Field of Search ............................... 428/40.1, 42.1, 428/42.2, 192, 194, 43, 213, 220; 206/411

(56) References Cited

U.S. PATENT DOCUMENTS 3,752,304 A * 8/1973 Alef ............................ 428/43
4,420,520 A * 12/1983 Jones et al. ................ 428/42.3
4,921,028 A * 5/1990 Schwartz .................... 150/155
5,730,354 A * 3/1998 O'Connor .................. 229/200

* cited by examiner

*Primary Examiner*—Nasser Ahmad
(74) *Attorney, Agent, or Firm*—Charles I. Brodsky

(57) ABSTRACT

A pre-cut sheeting of durable yet foldable plastic of substantially 4–6 mil thickness with a length of adhesion tape secured along the perimeter of its backing surface adjacent its outer edges, and a protective cover strip overlying the tape so as to be peelable therefrom at the time of intended use, employable in sealing out "bad air" from a room in the event of a chemical or biological attack.

7 Claims, 3 Drawing Sheets

SAFETY SHIELD FOR CHEMICAL AND BIOLOGICAL PROTECTION

CROSS-REFERENCE TO RELATED APPLICATIONS

None

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not applicable

BACKGROUND OF THE INVENTION

1. Field of the Invention

This invention relates to the possible threat of domestic terrorism, in general, and to the preparations to provide a shelter-in-place safe room from chemical or biological attack, in particular.

2. Description of the Related Art

As is well known and understood, potential terrorist attacks could send tiny microscopic "junk" into the air. For example, an explosion may release very fine debris that can cause lung damage, while a biological attack may release germs that could make one sick if inhaled or absorbed through open cuts. While face masks or dense weave cotton materials which snugly cover the nose and mouth can help filter contaminants in an emergency, staying put and creating a barrier between oneself and the potentially contaminated outside air is also highly desirable. Governmental pronouncements as to this essentially are to the effect that when large amounts of debris can be seen in the air, or when local authorities say the air is badly contaminated, heavy weight plastic garbage bags or plastic sheeting, duct tape, and scissors should be used to tape up windows, doors and air vents in providing a "shelter-in-place" sealed room.

One of the problems with this, however, is that the sheets—even if pre-cut—still need to be taped in place; this will be understood to take time first to start to peel the duct tape roll, then cutting the tape to the correct length of the sheet, and then aligning the tape correctly on the edges of the sheet, top-and-bottom and side-to-side. As will be appreciated, at the time of attack—especially of a chemical or biological nature—time is of the essence to provide as much protection as possible, and the anxiety and stress accompanying such an attack could very well degrade one's ability to perform these tasks effectively. As a result, the risk of exposure to such deadly contaminants is increased, and proportionately to the length of time to complete the task at hand—even if one were to have the necessary skill to pre-cut the sheets, to adequately label them as to where they are to be placed, and to somehow press them into position with one hand, while sealing them with the duct tape on the other hand. This becomes all the more difficult once one understands all the different openings that need to be sealed—such as return or supply air vents, wall or floor type HVAC vents, double casement or double hung windows, interior or exterior doors, skylights, through-the-wall airconditioners, etc.

SUMMARY OF THE INVENTION

As will become clear from the following description, the teachings of the present invention allow an enhancement of the speed in which an individual's or family's safe room can be sealed off while continuing to maintain its "shelter-in-place" integrity. Thus, in one aspect of the invention, a safety shield for chemical and biological protection includes a pre-cut plastic sheet of predetermined size and configuration, a length of adhesion tape secured along the perimeter of a backing surface of the sheet adjacent its outer edges, and a protective cover strip overlying the length of tape yet peelable therefrom at the time of intended use—and with the sheet being fabricated of a durable yet foldable plastic of substantially 4–6 mil thickness. As will be appreciated, the quick-start peel strip is easily removed to both expose the correct length of adhesive in eliminating the uncertainty of cutting duct tape from off a loose roll, and to allow the plastic sheet or sheeting to be optimally positioned for pressing into place once the peel is removed. With almost all wall, window, vent and door openings being of orthogonal shape, the pre-cut plastic sheet of the invention will be seen to also be of orthogonal configuration—and so as to allow sufficient clearance at all four sides for the adhesive edges to bond with the flat surface beneath, a minimum of 4 to 5 inches of clearance is appropriate. This leads to the adhesion tape being secured along the perimeter of the backing surface at least substantially 4 inches in from its outer edges.

Recognizing that doors, window and vents come in different sizes, a second aspect of the invention includes an easy open, user carryable rip-top pouch to enclose several ones of these pre-cut plastic sheetings of different size. Labelled, for example, with the individual sheeting contents, the rip-top pouch could be provided with instructions for use on one side, and with a clearly marked sizing of its contents on the other side. Alternatively, of course, in accordance with the invention, the pouch could be designed to enclose only one such plastic sheeting—for example, that for an entry door to the room to be sealed.

Analysis of different door, window and tent sizes commonly found in modern day construction yields a third aspect of the invention—namely, manufacturing lengths of pre-cut plastic sheetings of some 90 inch width, with slitters forming secondary vertical lines and secondary horizontal lines at intervals of 15 inch, 30 inch and 45 inch on the one hand, and at 22½, 30, 45 and 60 inch on the other hand, in providing additional sheets to cover mostly all room openings. In such manufacturing run, according to this aspect of the invention, the edges of each segment on both sides of the slitter lines receive the adhesive and protective tapes such that as the lengths cut shear, both the leading and trailing edges receive the adhesive and protective tapes in a simultaneous process involving both edges adjacent to the cut. Thus, from a 90 inch wide by 240 inch length of run, one 90×90 inch sheet, one 45×90 inch sheet, one 30×45 inch sheet, one 30×30 inch sheet, one 30×15 inch sheet, four 15×22½ inch sheets, and two 45×60 inch sheets could be fabricated, as an example.

As will be understood, the safety shield pack combinations could thus be sold for individual openings, or offered in combination packs to cover whole rooms. Whether the combinations may include two door sheets, three window sheets, three duct cover sheets, or otherwise, distribution could be through existing market outlets for drop cloths and standard sheeting, such as home centers, hardware stores, retail chains or on-line. In all respects, fabricating the plastic sheetings of at least a 4 mil thickness allows the safety shield to be durable and sturdy enough to stand up to any degree of use, yet flexible enough to be folded into a package so as could easily be carried by a purchaser to point of use installation. With the teachings of the invention, the user carryable pouch can very quickly be identified, the package opened, the sheeting removed, the protective strip peeled off, and the sheeting quickly pressed into position to be adhesively secured along the entire length and width of the sheeting. Once a room is thus sealed with the plastic sheeting of the invention, a more secure, more precise barrier is created to any external contaminants faster and more precise than available with plastic garbage bags, duct tape and scissors.

BRIEF DESCRIPTION OF THE DRAWINGS

These and other features of the present invention will be more clearly understood from a consideration of the following description, taken in connection with the accompanying Drawings, in which.

DETAILED DESCRIPTION OF THE INVENTION

Figure 1B:
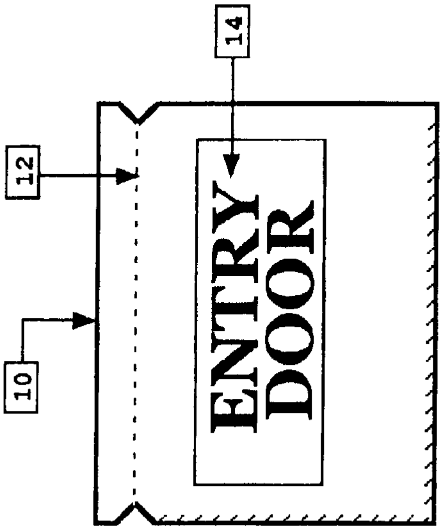
FIGS. 1*a*–1*c* pictorially illustrate the underlying concept of the present invention's use of pre-cut plastic sheets or sheetings with self-adhesive edges for shielding against chemical and biological contaminants.
Figure 1C:
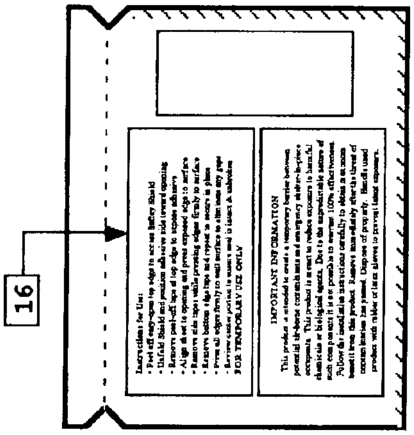

Reference numeral 10 in FIG. 1*b* identifies an easy open, user carryable pouch having rip-top opening 12 and a clearly marked description of a plastic sheet or sheeting enclosed within. Such identification is shown at 14 as "ENTRY DOOR", for example, with reference numeral 16 in FIG. 1*c* setting forth simple instructions to apply the plastic sheet to an entry door at the time of installation. As will be understood, FIG. 1*b* represents a front view of the rip-top pouch 10, while FIG. 1*c* represents a rear view.

Figure 1A:
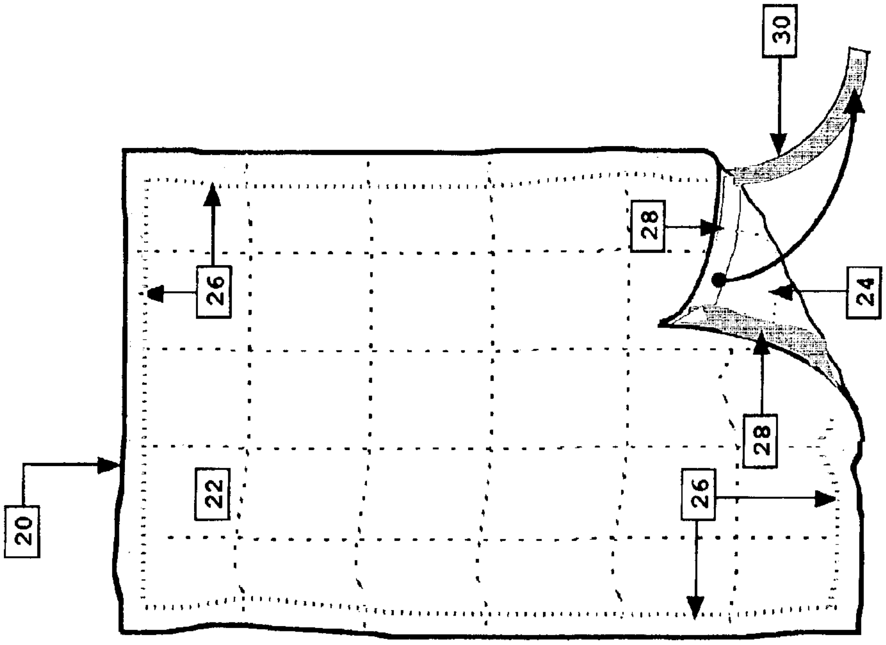

Reference numeral 20 in FIG. 1*a* identifies the plastic sheet within the pouch 10 of FIG. 1*b*. Having a front surface 22, the plastic sheet 20 has a backing surface 24 and a length of adhesion tape 26 secured along the perimeter of the surface 24 adjacent its outer edges 28. In particular, the adhesion tape 26 is secured along the perimeter at least some 4 inches in from the outer edge 28 to allow sufficient clearance for the adhesive to bond with a surface to which the tape is pressed. An easy start, protective cover strip 30 overlies the length of adhesion tape, to be peeled away at the time of intended use. In a preferred embodiment of the invention, the adhesion tape 26 may be in the form of any appropriate adhesive, pre-applied inwardly of all edges of the plastic sheet 20. In use, the pouch 10 is ripped open, the plastic sheet 20 is removed, the cover strip 30 is peeled from the tape 26, and the plastic sheet 22 is pressed in place, with its backing surface 24 against the door, wall, window frame, vent, etc., and with its front surface 22 facing inwardly of the room.

Demographic analysis has shown that typical dimensions have been established for single doors, double doors, standard windows, small window, large vents and small vents leading into, and found, within a room which could be designated as a "shelter-in-place" safe room against chemical and biological attack. Interior or exterior doors usually measure up to 36 inches wide and 80 inches high, while single or combination windows usually extend up to 36×80 inches or 80×36 inches. A plastic sheet to seal such dimensions, according to the invention, could then be orthogonal in configuration, 45 inches by 90 inches. As an interior or exterior double door (e.g. a French door, a patio door or sliding doors), and large windows commonly measure up to 72 inches wide and 80 inches high, a plastic sheet of 90×90 inch orthogonal configuration could be employed to provide such sealing.

As double casement or double hung windows usually are up to 36 inches wide by 48 inches high, a plastic sheet according to the invention to seal this—and also skylights of comparable size—may suffice, according to the invention, when of some 45×60 inch orthogonal dimension.

Smaller windows and vents can similarly be safety shielded in like manner according to the invention. With a single casement or narrow double hung window such as found in a bathroom, a plastic sheet of 30×45 inch dimensioning could provide the seal desired. For a large return or supply air vent (or for like small decorative windows and most through-the-wall airconditioners of 20×20 inch size or less), a plastic sheet of 30×30 inch configuration could provide the needed seal. For a standard size wall or floor type HVAC vent up to 16 inch wide by 8 inch high, a 15×22½ inch plastic sheet would be all that would be necessary—which could also serve for enclosing banks of wall switches, for example. In all installations, sufficient clearance is allowed at all four sides of the sheet or sheeting to allow the adhesive edges to bond with the wall surface, such as with a minimum of 4 inches.

Figure 2:
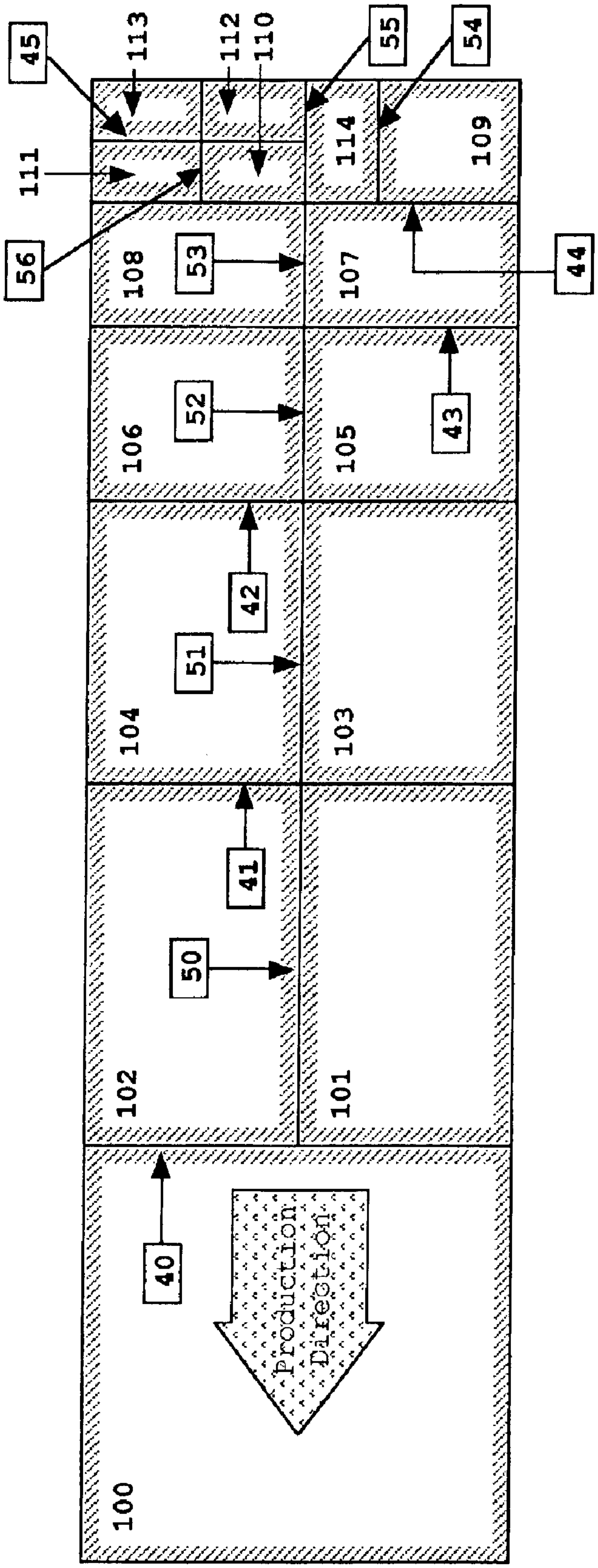
FIGS. 2 and 3 are helpful in an understanding of production line manufacture of the plastic sheeting embodying the safety shield of the invention.

FIG. 2 illustrates a layout of production line run for fabricating the plastic sheet of such optimum dimensions. From a 90×330 inch plastic sheet, for example, a first 90×90 inch shield 100 can be cut along the line 40. Secondary horizontal slitter lines 41, 42, 43, 44, 45, 46 provide additional shields of 90 inch, 60 inch, 30 inch, 30 inch, 15 and 15 inch lengths, respectively. Secondary vertical slitter lines 50, 51, 52 and 53 may be employed in forming shields 101–108 of 45 inch width, while slitter lines 54, 55 and 56 may be used to form shields 110–113 of 22½ inch width, and shields 109 and 114 of 30 inch and 15 inch width, respectively. As the production line runs, these horizontal and vertical slitter lines receive the adhesive and protector tapes on each side, such that as the length and widths cut shear, both leading and trailing edges receive such tapes simultaneously, on both sides adjacent to the slitter cut. In this manner, starting with a 90 inch wide plastic sheet, it can be sheared along its length and width to proceed from a 90×90 inch dimension, and then sheared down into the smaller sectional sizes required. The end result will thus be seen to be the production of sheets of durable yet foldable plastic of substantially 4–6 mil thickness to press against the opening where the contaminant might otherwise enter.

Figure 3:
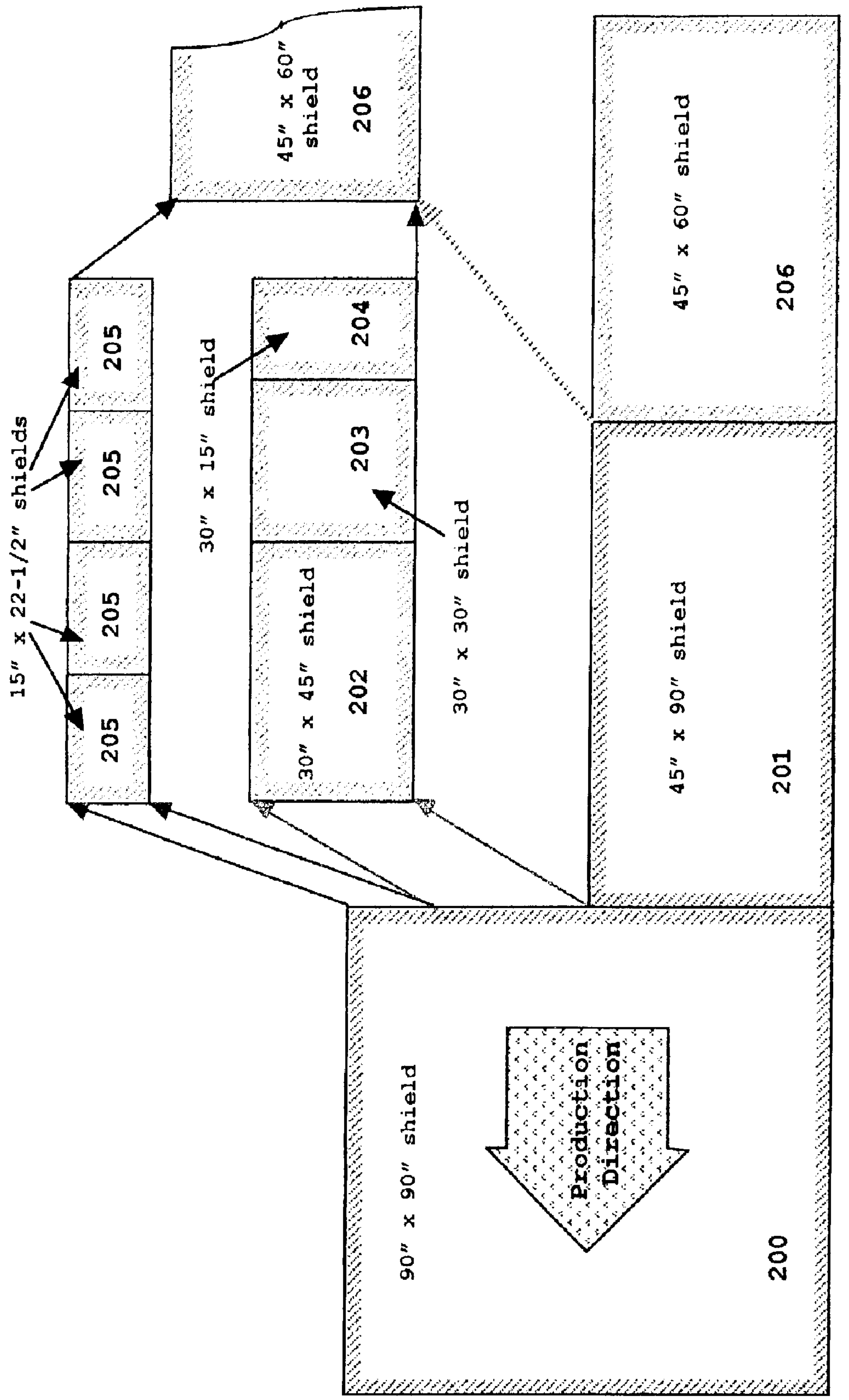

FIG. 3 illustrates a second production line run from a 90×240 inch plastic sheet which yields one 90×90 inch sheet 200, one 45×90 inch sheet 201, one 30×45 inch sheet 202, one 30×30 inch sheet 203, one 30×15 inch sheet 204, four 15×22½ inch sheets 205 and two 45×60 inch sheets 206.

While there have been described what are considered to be preferred embodiments of the present invention, it will be readily appreciated by those skilled in the art that modifications can be made without departing from the scope of the teachings herein. For example, in those instances where demographic research indicates that different size openings may be encountered, it will be but a simple matter to adjust the production tooling to vary the size of the plastic sheeting cuts as in FIG. 2. In such instances, plastic sheeting manufacture could be modified in the manner required so as to provide the pre-cut plastic sheeting in dimension to cover the openings with sufficient clearance at all sides for the adhesive edges to bond with the wall surface. In such manner, then, the available safety shield sheeting could be sold by retail chains such as WalMart or Kmart, or from other appropriate market outlets or via the Internet. For at least such reason, therefore, resort should be had to the claims appended hereto for a true understanding of the scope of the invention.

I claim:

1. A safety shield pack for the chemical and biological protection of a safe room comprising:

a. a safety shield having:
   - a pre-cut, orthogonally configured plastic sheeting of four outer edges and of predetermined size;
   - a length of adhesion tape running along a backing surface of said sheeting adjacent said outer edges; and
   - a protective cover strip overlying said adhesion tape, peelable therefrom at the time of intended use;
   - with said sheeting being fabricated of a durable yet foldable plastic of substantially 4–6 mil thickness impervious to the passage of germs and microscopic particles; and
   - with said adhesion tape and said overlying cover strip secured along said backing surface at least 4 inches in from said outer edges; and b. an easy open, user carryable rip-top pouch enclosing said safety shield.

2. The safety shield pack of claim 1 wherein said plastic sheeting is of the order of 90 inches wide, with slitters forming secondary vertical lines therein at intervals of 15, 30 and 45 inches.

3. The safety shield pack of claim 1 wherein said plastic sheeting is of the order of 90 inches wide, with slitters forming secondary horizontal lines therein at intervals of 22½, 30, 45, 60 and 90 inches.

4. The safety shield pack of claim 1 wherein said plastic sheeting is of the order of 90 inches wide, with first slitters forming secondary vertical lines therein at intervals of 15, 30 and 45 inches, and with second slitters forming secondary horizontal lines therein at intervals of 22½, 30, 45, 60 and 90 inches.

5. A safety shield pack for the chemical and biological protection of a safe room comprising:

a. a safety shield having:
   - a plurality of pre-cut, orthogonally configured plastic sheetings, each of predetermined size;
   - lengths of adhesion tape running along a backing surface of each of said plastic sheetings adjacent the outer edges of each said sheeting; and
   - a protective cover strip overlying each of said lengths of adhesion tape, peelable therefrom at the time of intended use;
   - with each said sheeting being fabricated of a durable yet foldable plastic of substantially 4–6 mil thickness impervious to the passage of germs and microscopic particles; and
   - with said adhesion tape and said overlying cover strip secured along the backing surface of each plastic sheeting at least 4 inches in from said outer edges thereof; and b. an easy open, user carryable rip-top pouch enclosing said plurality of plastic sheetings.

6. The safety shield pack of claim 5 wherein said pouch encloses one plastic sheeting of 90×90 inch size, two plastic sheetings of 45×90 inch size, two plastic sheetings of 45×60 inch size, four plastic sheetings of 45×30 inch size, one plastic sheeting of 30×30 inch size, four plastic sheetings of 22½×15 inch size and one plastic sheeting of 15×30 inch size, and with said lengths of adhesion tape and said overlying cover strips respectively secured long the backing surface of each plastic sheeting at least 4 inches in from the outer edges of each such sheeting.

7. The safety shield pack of claim 5 wherein said pouch encloses one plastic sheeting of 90×90 inch size, one plastic sheeting of 45×90 inch size, one plastic sheeting of 30×45 inch size, one plastic sheeting of 30×30 inch size, one plastic sheeting of 30×15 inch size, four plastic sheetings of 15×22½ inch size, and two plastic sheetings of 45×60 inch size, and with said lengths of adhesion tape and said overlying cover strips respectively secured a long the backing surface of each plastic sheeting at least 4 inches in from the outer edges of each such sheeting.

* * * * *